Patented Mar. 9, 1948

2,437,387

UNITED STATES PATENT OFFICE 2,437,387

PROCESS FOR THE HARDENING OF SOIL AND THE LIKE

Ronald Mortimer Hodgson, London, England

No Drawing. Application July 1, 1946, Serial No. 680,841. In Great Britain July 11, 1945

12 Claims. (Cl. 61—36)

This invention relates to the hardening of the soil, by which expression I intend to include not only soil as ordinarily understood, but artificial deposits, such as dumps of coal ash, cinders and slag.

The principal object of the invention is to overcome the lack of cohesion of many natural soils by pouring certain solutions into the soil, which will react to produce a final precipitate in the soil, such as to harden the soil after a lapse of time, and render it capable of supporting a heavier load than in the natural state.

A further object of the invention is to provide a method of hardening clay soils or soils containing clay.

A still further object of the invention is to provide a method of hardening very wet or waterlogged soil.

Yet another object is to provide a method of hardening sandy soil.

According to the invention, a process of hardening the soil consists essentially in treating the soil with a solution of a material selected from the group consisting of calcium and magnesium chloride and with a solution of a material selected from the group consisting of sodium and potassium hydroxides, so as to form a precipitate of calcium or magnesium hydroxide in the soil, and thereafter treating the soil with a solution of sodium silicate.

In carrying the invention into effect, the soil is first of all prepared so as to produce the form into which the soil is required to harden. For example, in the case of roads, the surface soil is removed and the exposed surface rolled, if necessary, or shallow trenches or the like may be excavated for foundations. A strong solution of calcium or magnesium chloride is poured or sprayed on to the soil and allowed to sink in. A strong solution of sodium or potassium hydroxide is then poured or sprayed on and allowed to sink in, thus precipitating the calcium or magnesium of the calcium or magnesium chloride in the form of calcium or magnesium hydroxide which, being insoluble, is distributed evenly throughout the soil and is held in position by the particles of soil so that it is not washed out by the third solution applied which is a solution of sodium silicate. The precipitate of calcium or magnesium hydroxide does not harden the soil but after the solution of sodium silicate has been poured or sprayed on to the soil and allowed to sink in, the soil will appreciably harden at the end of twenty-four hours and become very hard after a week or two.

In applying the process to clay soils and to soils containing clays, the soil should be mechanically mixed, after the application of the second and third solutions, to the depth to which the soil is desired to harden. If the soil is impermeable, or almost impermeable, it should be mechanically mixed after the application of each of the three solutions.

In treating very wet or water-logged soil, I have found it advantageous to mix both the calcium chloride and the sodium hydroxide in solid form with the soil, although the sodium silicate must be applied in liquid form.

When treating clayey, sandy and fine-grained soils, I have found it advantageous to make two or or more alternate applications each of the calcium chloride and sodium hydroxide before the application of the sodium silicate, the number of applications of the calcium chloride and sodium hydroxide depending on the degree of fineness of the soil.

In any of the various treatments within the scope of the present invention, the soil may either be treated in situ or may be temporarily removed for treatment (say in a concrete mixer) and then relaid.

Various methods of carrying the invention into effect as applied to various types of soil will now be described with reference to the following examples.

*Example I*

A surface layer of soil 10" deep was first removed and the exposed surface of the subsoil (which was permeable) was then raked and rolled. A solution of calcium chloride containing 5 lb. per gallon was then applied to the surface at the rate of 3 gallons per square yard and allowed to sink in until none remained on the surface. A solution of sodium hydroxide containing 3¼ lb. per gallon was then applied at the rate of 3 gallons per square yard and allowed to sink in. A solution of sodium silicate containing 6 lb. per gallon was then applied to the soil at the rate of 3 gallons per square yard and allowed to sink in. No immediate change was observed but after twenty-four hours the soil was perceptibly hard and after one week it was harder than frozen ground. Later, part of the hardened soil was excavated and it was found to have hardened to an average depth of six inches.

*Example II*

The turf and surface soil were removed to a depth of 2" and the exposed surface soil which had a total depth of 14" above the subsoil was then raked and rolled. A solution of calcium chloride containing 5 lb. per gallon was then applied to the surface at the rate of 4 gallons per square yard and allowed to sink in until none remained on the surface. A solution of sodium hydroxide containing 3 lbs. per gallon was then applied at the rate of 4 gallons per square yard and allowed to sink in. A solution of sodium silicate containing 6 lb. per gallon was then applied to the soil at the rate of 4 gallons per square yard and allowed to sink in. No immediate change was observed but after twenty-four hours the soil was distinctly hard and was as hard as frozen ground after one week. Later, part of the hardened soil was excavated and it was found to have hardened to an average depth of eight inches.

Example III

The surface of an ash bank was raked and rolled. A solution of calcium chloride containing 7 lb. per gallon was applied boiling hot to the surface at the rate of 3 gallons per square yard and allowed to sink in. A solution of sodium hydroxide containing 5 lb. per gallon was then applied boiling hot to the surface at the rate of 3 gallons per square yard and allowed to sink in. A solution of sodium silicate containing 8 lb. per gallon was then applied to the surface boiling hot at the rate of 3 gallons per square yard and allowed to sink in. The ash surface became as hard as frozen ground at once and after two hours was as hard as weak concrete. Later, part of the bank was excavated and it was found to have hardened to an average depth of seven inches. When ash is treated with boiling hot solution the hardening takes place very quickly.

Example IV

The grass and surface soil, which had a depth of six inches, were removed from ground which had a clayey subsoil. A solution of calcium chloride containing 6 lb. per gallon was then applied to the surface at the rate of 2 gallons per square yard and allowed to sink until little or none of the solution was left. A solution of sodium hydroxide containing 4½ lb. per gallon was then applied to the soil at the rate of 2 gallons per square yard. As this solution would not sink in the soil was dug through to a depth of six inches and this mixing of the soil caused the second solution to be absorbed. Then a solution of sodium silicate containing 7 lb. per gallon was applied to the soil and whilst applying it the soil was dug through again. The surface was then levelled and rolled and was appreciably stiffer and firmer than before the treatment started. After twenty-four hours the soil was nearly as hard as frozen ground. Later, on excavating, the soil was found to have hardened to an average depth of six inches.

Example V

The weeds from the surface of a sand dune were removed and the surface levelled and raked. A solution of calcium chloride containing 7 lb. per gallon was applied to the surface at the rate of 2 gallons per square yard and allowed to sink in. A solution of sodium hydroxide containing 5 lb. per gallon was then applied to the surface at the rate of 2 gallons per square yard and allowed to sink in. Then exactly the same solutions of calcium chloride and sodium hydroxide were again applied in the same quantities. A solution of sodium silicate containing 8 lb. per gallon was then applied to the surface at the rate of 4 gallons per square yard and allowed to sink in. The sand was observed to be appreciably hard as soon as the last of the sodium silicate had sunk in, and to be hard as frozen ground in twenty-four hours. After a week it was as hard as a weak concrete. When excavated the sand was found to have hardened to an average depth of seven inches.

Example VI

The vegetation was removed from waterlogged clayey ground and approximately two cubic feet of the soaking wet soil shovelled on to an iron sheet and 2½ lb. of crushed calcium chloride added to it and mixed into the soil with a shovel. Then 1½ lb. of sodium hydroxide was similarly mixed with the soil which had now become much drier. Then ⅓ gallon of a solution of sodium silicate containing 9 lb. per gallon was mixed with the soil, which was placed on a prepared site from which the vegetation had been removed. This process was repeated until a bank had been built whose levelled and smoothed surface was twelve inches above the surface of the water of the water-logged ground. The treated soil was fairly hard after twenty-four hours and as hard as frozen ground after a week. Later, having drained the water from the site and after excavating the whole of the treated soil was found to be hardened, and firmly cemented to the untreated soil beneath.

When treating clayey and fine-grained soils, I have found it advantageous to leave the soil after the application of the calcium chloride and sodium hydroxide for twenty-four to forty-eight hours before the sodium silicate is applied.

The process can be applied with advantage to the hardening of coal ash, cinders and slag, especially if the solutions are applied hot. The process can be repeated in many cases to bring about further hardening of the soil or the like.

The process can be effectively applied to the foundations of buildings and roads and railways, to prevent collapsing or subsidence of banks and cuttings, and for other purposes where a more consolidated soil would have a practical advantage over natural soil and the like.

I claim:

1. A process of hardening the soil which consists essentially in treating the soil with a solution of a material selected from the group consisting of calcium and magnesium chlorides, and with a solution of a material selected from the group consisting of sodium and potassium hydroxides, and thereafter treating the soil with a solution of sodium silicate.

2. A process of hardening the soil, which consists essentially in successively treating the soil with a solution of a material selected from the group consisting of calcium and magnesium chlorides, a solution of a material selected from the group consisting of sodium and potassium hydroxides, and with a solution of sodium silicate, in that order.

3. A process according to claim 1, wherein the solutions are sprayed on to the soil.

4. A process according to claim 1, wherein the solutions are applied hot.

5. A process of hardening clay soils, which consists in applying thereto a solution of calcium chloride, thereafter applying a solution of sodium hydroxide, mechanically mixing the soil to the depth to which it is required to harden, thereafter applying a solution of sodium silicate, and again mechanically mixing the soil to said depth.

6. A process according to claim 5, wherein the soil is mechanically mixed to said depth after the application of said solution of calcium chloride.

7. A process of hardening very wet soil, which consists in mixing solid calcium chloride with the soil to the depth to which it is required to harden, thereafter mixing solid sodium hydroxide with the soil to said depth, and finally applying a solution of sodium silicate to the soil.

8. A process of hardening soil which comprises successively mixing the soil with solutions of calcium chloride, sodium hydroxide and sodium silicate to the depth to which it is desired to harden.

9. A process of hardening soil which consists in removing the soil from the ground to the required depth, successively treating the soil with calcium chloride, sodium hydroxide and sodium silicate, and returning the treated soil to the ground.

10. A process according to claim 9, wherein said calcium chloride, sodium hydroxide and sodium silicate are added in the form of their solutions.

11. A process according to claim 9, wherein the said calcium chloride and sodium hydroxide are added in the solid state, and the sodium silicate in the form of its solution.

12. A process of hardening sandy soils, which comprises successively applying thereto solutions of calcium chloride, sodium hydroxide, calcium chloride again, sodium hydroxide again, and sodium silicate.

RONALD MORTIMER HODGSON.